(12) United States Patent
Keeney et al.

(10) Patent No.: US 10,035,384 B2
(45) Date of Patent: Jul. 31, 2018

(54) TIRE INFLATION SYSTEM WITH A PASSAGE FOR ROUTING PRESSURIZED GAS

(71) Applicant: ArvinMeritor Technology, LLC, Troy, MI (US)

(72) Inventors: Christopher Keeney, Troy, MI (US); James Keane, West Bloomfield, MI (US); Michael Andrew Power, Troy, MI (US); Dale Kwasniewski, Galesburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/254,743

(22) Filed: Sep. 1, 2016

(65) Prior Publication Data

US 2016/0368331 A1    Dec. 22, 2016

Related U.S. Application Data

(62) Division of application No. 14/029,856, filed on Sep. 18, 2013, now Pat. No. 9,452,644.

(51) Int. Cl.
*B60C 23/00*   (2006.01)

(52) U.S. Cl.
CPC ................. *B60C 23/003* (2013.01)

(58) Field of Classification Search
CPC .......................................... B60C 23/003
USPC ....................................... 152/417
See application file for complete search history.

(56) References Cited

U.S. PATENT DOCUMENTS

| 3,705,614 | A | * | 12/1972 | Juttner ................. B60C 23/003 |
| | | | | 152/417 |
| 4,418,737 | A | | 12/1983 | Goodell et al. |
| 4,431,043 | A | | 2/1984 | Goodell et al. |
| 4,440,451 | A | | 4/1984 | Goodell et al. |
| 4,470,506 | A | | 9/1984 | Goodell et al. |
| 4,498,709 | A | * | 2/1985 | Wells .................. B60B 27/0031 |
| | | | | 152/417 |
| 4,582,107 | A | | 4/1986 | Scully |
| 5,174,839 | A | | 12/1992 | Schultz et al. |
| 5,253,688 | A | | 10/1993 | Tigges |
| 6,145,558 | A | * | 11/2000 | Schmitz ............... B60C 23/003 |
| | | | | 152/416 |
| 6,994,136 | B2 | | 2/2006 | Stanczak |
| 7,690,412 | B1 | | 4/2010 | Jenkinson et al. |
| 7,931,061 | B2 | | 4/2011 | Gonska et al. |
| 8,616,254 | B2 | | 12/2013 | Kelley et al. |
| 8,915,274 | B2 | * | 12/2014 | Eschenburg .......... B60C 23/003 |
| | | | | 152/416 |
| 2002/0112802 | A1 | | 8/2002 | D'Amico et al. |
| 2009/0211682 | A1 | | 8/2009 | Sobotzik |
| 2012/0186714 | A1 | | 7/2012 | Richardson |
| 2012/0234447 | A1 | | 9/2012 | Narloch et al. |

(Continued)

OTHER PUBLICATIONS

Meritor (Trademark) an ArvinMeritor brand, Mentor Tire Inflation System (MTIS) by PSI (Trademark) including Meritor ThermALERT (Trademark), PB-9999, Revised May 2007.

*Primary Examiner* — Kip T Kotter
(74) *Attorney, Agent, or Firm* — Brooks Kushman P.C.

(57) ABSTRACT

A tire inflation system having a spindle that is configured to support a wheel bearing. A passage for routing pressurized gas may be provided with the spindle or with a sleeve that may be disposed on the spindle.

20 Claims, 3 Drawing Sheets

(56) References Cited

U.S. PATENT DOCUMENTS

2013/0228258 A1 9/2013 Knapke et al.
2015/0352911 A1* 12/2015 Bittlingmaier ........ B60C 23/003
 152/417

* cited by examiner

TIRE INFLATION SYSTEM WITH A PASSAGE FOR ROUTING PRESSURIZED GAS

CROSS-REFERENCE TO RELATED APPLICATIONS

This application is a division of U.S. application Ser. No. 14/029,856, filed Sep. 18, 2013, now U.S. Pat. No. 9,452,644, the disclosure of which is hereby incorporated in its entirety by reference herein.

TECHNICAL FIELD

This patent application relates to a tire inflation system having a passage for routing pressurized gas.

BACKGROUND

A tire inflation system with an integral wheel seal is disclosed in U.S. Pat. No. 7,931,061.

SUMMARY

In at least one embodiment, a tire inflation system is provided. The tire inflation system may include a spindle and a plug. The spindle may be configured to support a wheel bearing and may have an end surface, an internal surface, an external surface, and a passage for routing pressurized gas through the spindle. The internal surface may extend from the end surface and may at least partially define a hole for receiving an axle shaft. The external surface may be disposed opposite the internal surface. The passage may include a first portion, a second portion, and a third portion. The first portion may extend from the external surface toward the internal surface. The second portion may extend from the external surface toward the internal surface. The third portion may connect the first portion to the second portion. The plug may be disposed in the third portion.

In at least one embodiment, a tire inflation system is provided. The tire inflation system may include a spindle and a sleeve. The spindle may be configured to support a wheel bearing and may have an end surface and an internal surface. The internal surface may extend from the end surface and may at least partially define a hole for receiving an axle shaft. The sleeve may have a sleeve opening that receives the spindle. The sleeve may at least partially define a passage for routing a pressurized gas. The passage may include a first portion, a second portion that may be spaced apart from the first portion, and a third portion that may extend from the first portion to the second portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
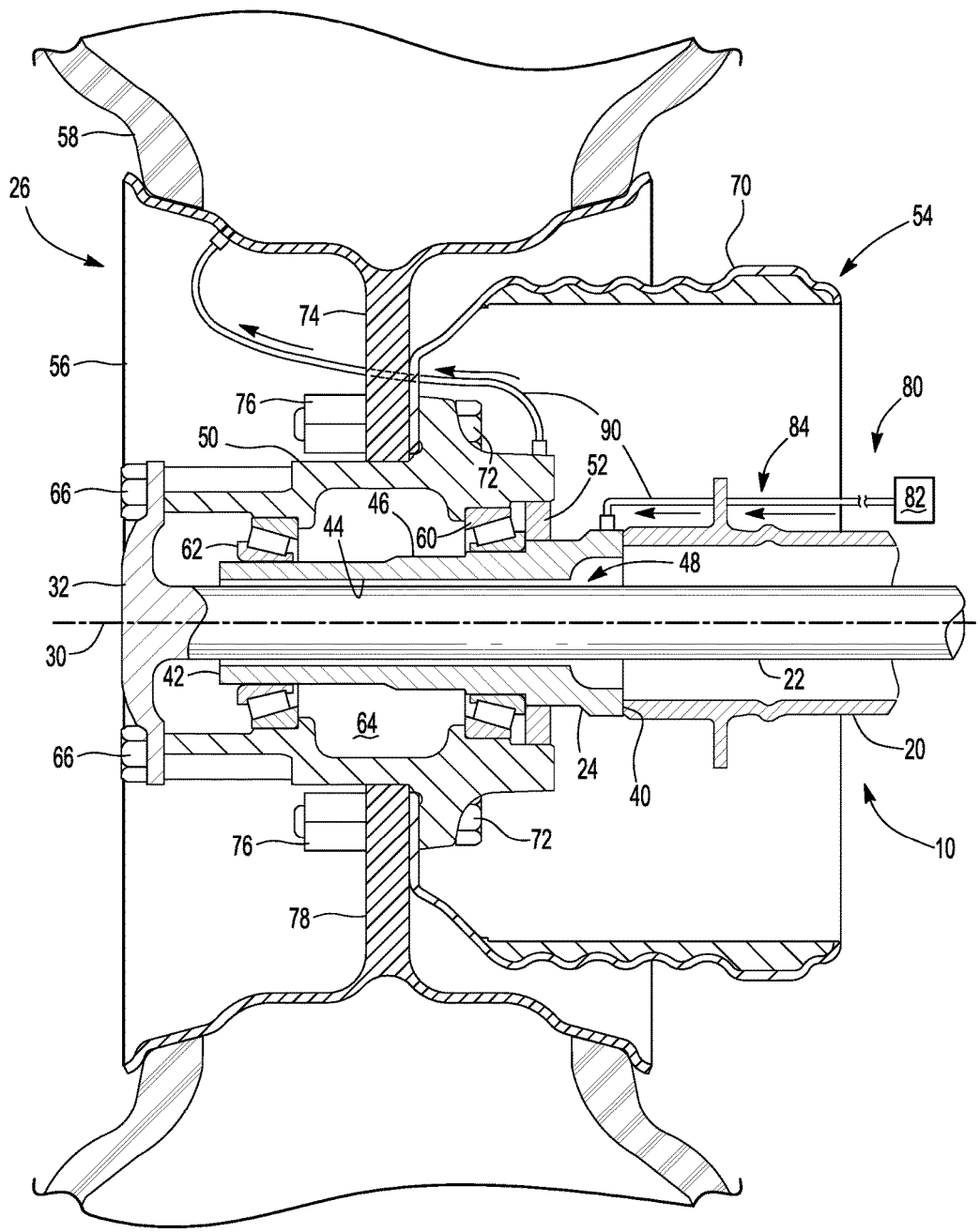
FIG. 1 is a section view of an exemplary wheel end assembly having a tire inflation system.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may be configured as a drive axle that may receive torque from a power source, such as an internal combustion engine or electric motor. Alternatively, the axle assembly 10 may be configured as a non-drive axle in one or more embodiments. The axle assembly 10 may or may not be steerable. In a drive axle configuration, the axle assembly 10 may include an axle housing 20, an axle shaft 22, a spindle 24, and a wheel end assembly 26.

The axle housing 20 may receive various components of the axle assembly 10. In addition, the axle housing 20 may facilitate mounting of the axle assembly 10 to the vehicle. The axle housing 20 may define a cavity that may receive at least a portion of the axle shaft 22.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first end surface 40, a second end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first end surface 40 may be disposed proximate or may engage the axle housing 20. The second end surface 42 may be disposed opposite the first end surface 40 and may be located near the axle flange 32. The internal surface 44 may extend between the first end surface 40 and the second end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a wheel end seal assembly 52, a brake subsystem 54, a wheel 56, and a tire 58.

The hub 50 may be spaced apart from and rotatably disposed on the spindle 24. For instance, one or more wheel bearings may be mounted on spindle 24 and may rotatably support the hub 50. In FIG. 1, a first wheel bearing 60 and a second wheel bearing 62 are provided in a cavity 64 that is located between the spindle 24 and the hub 50. The first wheel bearing 60 may be disposed inboard or further from the second end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle 22 or axle flange 32.

The wheel end seal assembly 52 may be disposed between the spindle 24 and the hub 50. The wheel end seal assembly 52 may inhibit contaminants from entering the cavity 64 and may help retain lubricant in the cavity 64. In at least one embodiment, the wheel end seal assembly 52 may be fixedly disposed with respect to the hub 50 and may rotate about the axis 30 and with respect to the spindle 24.

The brake subsystem 54 may be adapted to slow or inhibit rotation of at least one associated wheel 56. For example, the brake subsystem 54 may be configured as a friction brake, such as a drum brake or a disc brake. In FIG. 1, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56 may be fixedly disposed on the hub 50. For example, the wheel 56 may be mounted on the hub 50 via the fasteners 72. More specifically, the wheel 56 may have a wheel mounting flange 74 that may have a set of holes that may each receive a fastener 72. A lug nut 76 may be threaded onto each fastener to secure the wheel 56 to the fasteners 72 and the hub 50. The lug nut 76 may engage or may be disposed proximate an outboard side 78 of the wheel mounting flange 74 that faces way from the brake drum 70 or toward the axle flange 32. The wheel 56 may be configured to support the tire 58. The tire 58 may be a pneumatic tire that may be inflated with a pressurized gas or pressurized gas mixture.

A tire inflation system 80 may be associated with the wheel end assembly 26. The tire inflation system 80 may be disposed on the vehicle and may be configured to provide a pressurized gas or pressurized gas mixture to one or more tires 58. For clarity, the term "pressurized gas" may refer to either a pressurized gas or a pressurized gas mixture in this application. The tire inflation system 80 may include a control system that may monitor and control the inflation of one or more tires 58, a pressurized gas source 82, and a gas supply subsystem 84.

The pressurized gas source 82 may be configured to supply or store a volume of a pressurized gas or pressurized gas mixture, like air or nitrogen. For example, the pressurized gas source 82 may be a tank and/or a pump like a compressor. The pressurized gas source 82 may be disposed on the vehicle and may provide a pressurized gas or pressurized gas mixture at a pressure that is greater than or equal to a desired inflation pressure of a tire 58. As such, the pressurized gas source 82 may inflate a tire or maintain a desired tire pressure.

The gas supply subsystem 84 may fluidly connect the pressurized gas source 82 to the tire 58. The gas supply subsystem 84 may include one or more conduits 90, 90', 90", 90''', such as a hose, tubing, pipe, or combinations thereof. In addition, one or more valves may be associated with or provided with a conduit 90, 90', 90", 90''' to enable or disable the flow of the pressurized gas from the pressurized gas source 82 to one or more tires 58. The routing of the conduits 90, 90', 90", 90''' between the pressurized gas source 82 and a tire 58 is exemplary and is not meant to be limiting as other conduit routing paths may be provided. The flow of pressurized gas is represented by the arrows located adjacent to the conduit 90, 90', 90", 90''' in FIGS. 1-5.

Figure 2:
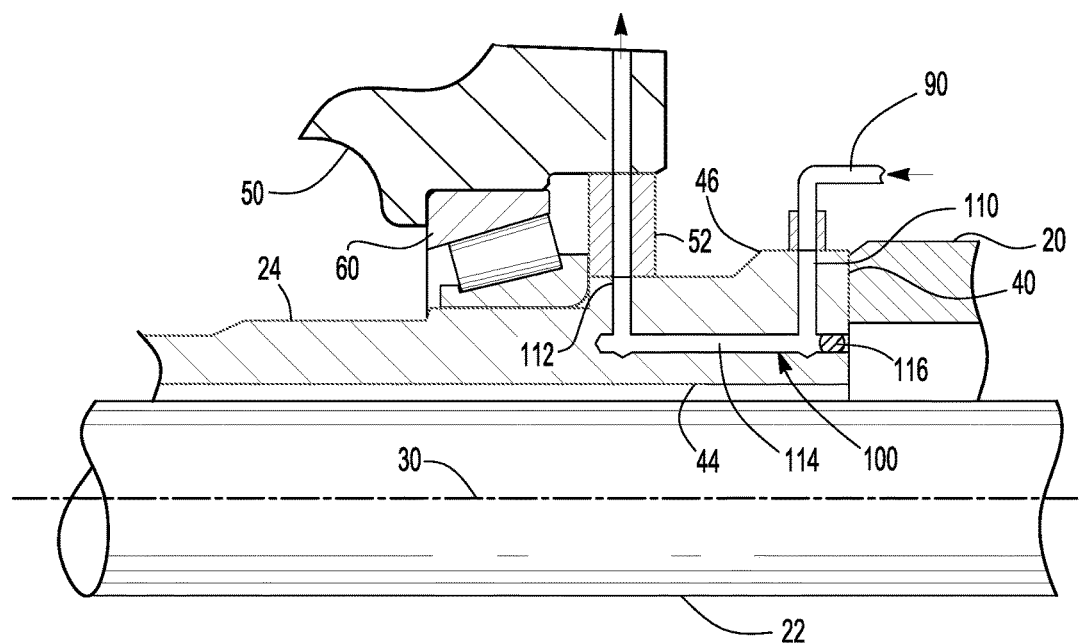
FIGS. 2-5 are section views illustrating passages for routing pressurized gas that may be provided with the tire inflation system.
Figure 3:
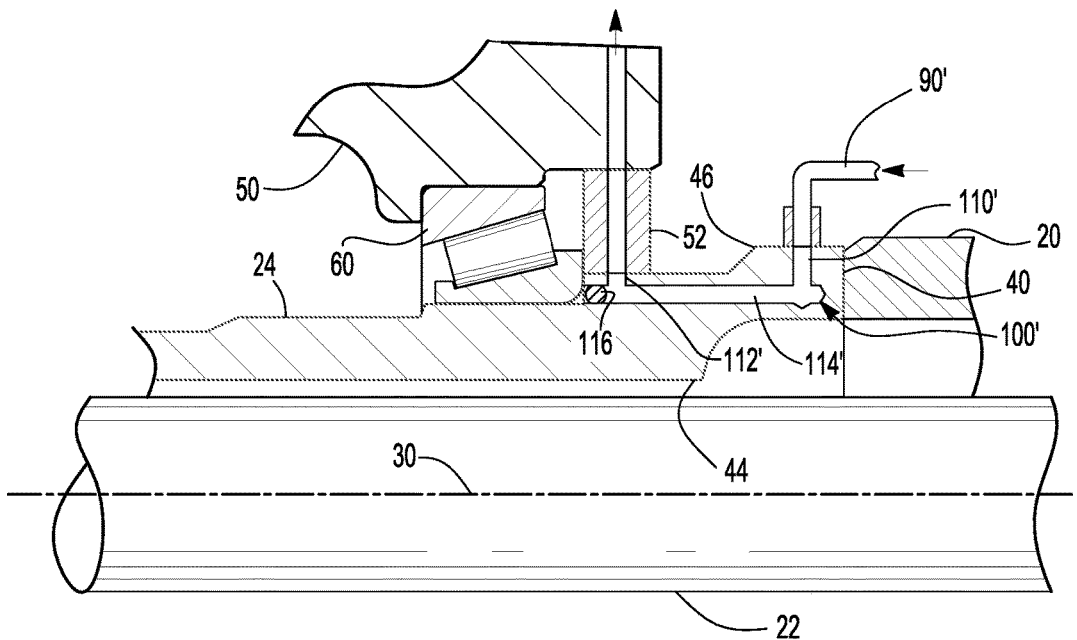
Figure 4:
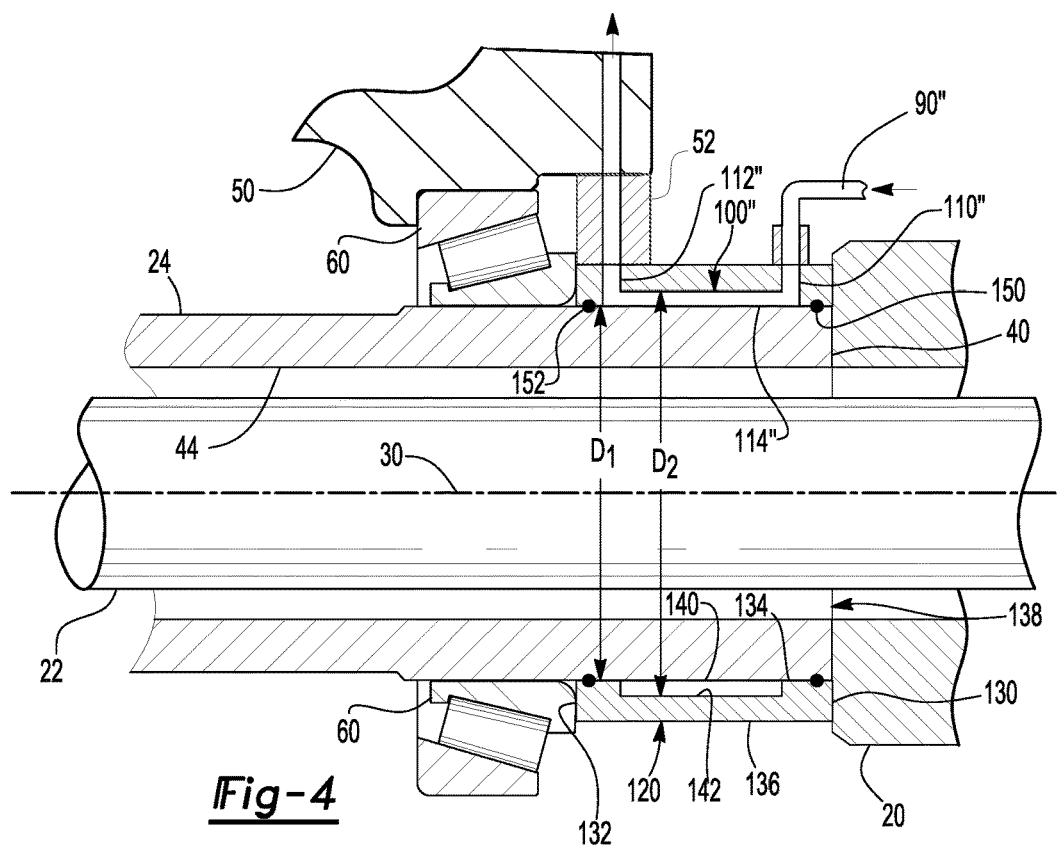
Figure 5:
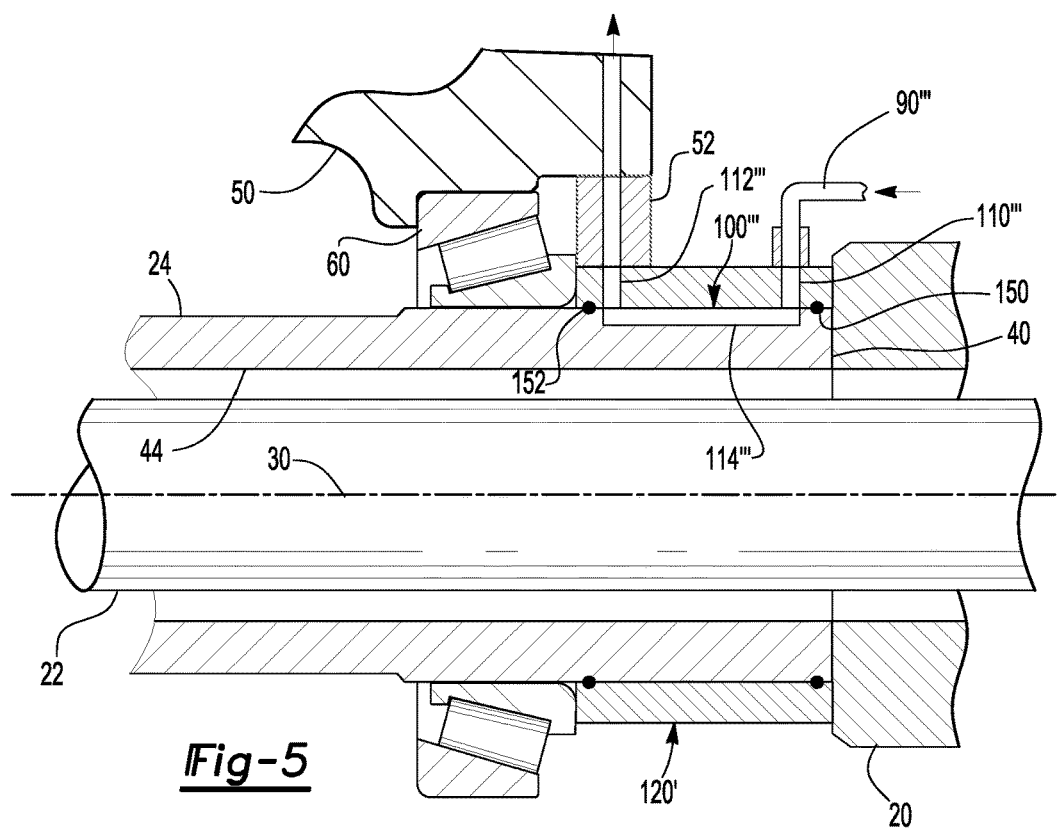

Referring to FIGS. 2 and 3, the gas supply subsystem 84 may include a passage 100, 100' that may extend through the spindle 24. The passage 100, 100' may include a first portion 110, 110' a second portion 112, 112' and a third portion 114, 114'. Corresponding reference numbers are employed in FIGS. 4 and 5. FIG. 4 shows a passage 100", first portion 110", second portion 112", and third portion 114". FIG. 5 shows a passage 100''', first portion 110''', second portion 112''', and third portion 114'''.

The first portion 110, 110', 110", 110''' may be an inlet that receives pressurized gas from the gas supply subsystem 84. The first portion 110, 110', 110", 110''' may be disposed between the first end surface 40 of the spindle 24 and the first wheel bearing 60. The first portion 110, 110' may extend from the external surface 46 toward the internal surface 44. In at least one embodiment, the first portion 110, 110', 110", 110''' may extend toward the axis 30 and may be linear.

The second portion 112, 112', 112", 112''' may be an outlet that delivers pressurized gas to another component, such as the seal assembly 52. The second portion 112, 112', 112", 112''' may also be disposed between the first end surface 40 of the spindle 24 and the first wheel bearing 60. The second portion 112, 112', 112", 112''' may be spaced apart from the first portion 110. The second portion 112, 112' may extend from the external surface 46 toward the internal surface 44. In at least one embodiment, the second portion 112, 112', 112", 112''' may extend toward the axis 30 and may be linear. The second portion 112, 112' may have a shorter length than the first portion 110, 110'.

The third portion 114, 114', 114", 114''' may connect the first portion 110, 110', 110", 110''' to the second portion 112, 112', 112", 112''. In the embodiment shown in FIG. 2, the third portion 114 extends from the first end surface 40 toward the first wheel bearing 60 and may terminate proximate the second portion 112. The third portion 114, 114', 114", 114''' may be substantially linear and may extend parallel to the axis 30 in one or more embodiments. A plug 116 may be disposed in the third portion 114 between the first end surface 40 and the first portion 110 to inhibit leakage of a pressurized gas. The plug 116 may have any suitable configuration. For example, the plug 116 may be configured as a ball that may be press fit into the third portion 114, 114'.

In the embodiment shown in FIG. 3, the third portion 114, 114' extends from the first wheel bearing 60 to the first portion 110, 110'. The plug 116 may be disposed in the third portion 114, 114' between the first wheel bearing 60 and the second portion 112, 112' to inhibit leakage of pressurized gas.

Referring to FIGS. 4 and 5, additional examples of passages that may be provided with the gas supply subsystem 84 are shown. In FIGS. 4 and 5, the spindle 24 has a sleeve 120, 120' that may at least partially define the passage 100", 100'''.

The sleeve 120, 120' may have a generally cylindrical configuration and may be extend around the axis 30. As such, the sleeve 120, 120' and spindle 24 may be concentrically disposed about the axis 30. In at least one embodiment, may include a first sleeve end 130, a second sleeve end 132, an interior surface 134, and an exterior surface 136.

The first sleeve end 130 may be disposed proximate the first end surface 40 of the spindle 24 and may engage the axle housing 20. The first sleeve end 130 may extend from the interior surface 134 to the exterior surface 136.

The second sleeve end 132 may be disposed opposite the first sleeve end 130 and may be disposed proximate or may engage the first wheel bearing 60. The second sleeve end 132 may also extend from the interior surface 134 to the exterior surface 136.

The interior surface 134 may extend between the first and second sleeve ends 130, 132 and may at least partially define a sleeve opening 138 through which the spindle 24 may extend. The interior surface may at least partially define an inside circumference of the sleeve 120, 120' and may be disposed proximate or may engage the external surface 46 of the spindle 24.

The exterior surface 136 may also extend between the first sleeve end 130 and the second sleeve end 132. The exterior surface 136 may be disposed opposite the interior surface 134 and may at least partially define an outside circumference of the sleeve 120, 120'.

The passage may include a first portion 110", 110'", a second portion 112", 112'", and a third portion 114", 114'".

The first portion 110", 110'" may be an inlet that receives pressurized gas from the gas supply subsystem 84. The first portion 110", 110'" may be configured as a hole in the sleeve 120, 120' that may extend from the exterior surface 136 to the interior surface 134. In at least one embodiment, the first portion 110", 110'" may extend toward the axis 30 and may be linear.

The second portion 112", 112'" may be an outlet that delivers pressurized gas to another component, such as the seal assembly 52. The second portion 112", 112'" may be spaced apart from the first portion 110", 110'". In addition, the second portion 112", 112'" may be configured as a hole in the sleeve 120, 120' that may extend from the exterior surface 136 toward the interior surface 134. In at least one embodiment, the second portion 112", 112'" may extend toward the axis 30 and may be linear.

The third portion 114", 114'" may extend from the first portion 110", 110'" to the second portion 112", 112'". The third portion 114", 114'" may be at least partially defined by the spindle 24. In the embodiments shown in FIGS. 4 and 5, the spindle 24 cooperates with the sleeve 120' to define the third portion 114", 114'".

In FIG. 4, the third portion 114", 114'" is configured as a groove 140 that may be recessed into the sleeve 120. The groove 140 may have a bottom surface 142 that may extend from the first portion 110", 110'" to the second portion 112", 112'". The bottom surface 142 may be disposed further from the axis 30 than the interior surface 134 of the sleeve 120. For example, the diameter of the sleeve 120 proximate the interior surface 134, designated $D_1$, may be less than the diameter proximate the bottom surface 142, designated $D_2$ in FIG. 4. The groove 140 may extend continuously around the axis 30 in a ringlike manner. Alternatively, the groove 140 may not extend completely around the axis 30 and may extend generally parallel to the axis 30 from the first portion 110", 110'" to the second portion 112", 112'".

In FIG. 5, the third portion 114'" is recessed into the spindle 24 instead of being configured as a recess or groove in the sleeve 120'. As such, the interior surface 134 of the sleeve 120' may be generally cylindrical and may at least partially define the third portion 114'".

It is also contemplated that the third portion 114", 114'" may recessed into both the spindle 24 and the sleeve 120, 120' in one or more embodiments.

One or more sleeve seals may be disposed between the sleeve 120, 120' and the spindle 24 to inhibit leakage of pressurized gas. In FIGS. 4 and 5, a first seal 150 and a second seal 152 are provided. The first seal 150 may be disposed between the first sleeve end 130 and the first portion 110", 110'". The second seal 152 may be disposed between the second sleeve end 132 and the second portion 112", 112'". The first and second seals 150, 152 may have any suitable configuration. For example, the first and second seals 150, 152 may be configured as o-rings.

The embodiments discussed above may allow a spindle to be provided with a standardized external profile between the first wheel bearing and the second end while also equipping the spindle with a passage for supplying pressurized gas with a tire inflation system. By localizing the passage between the inboard end of the spindle and the first wheel bearing a passage may be provided with a short length to reduce associated manufacturing costs as compared to longer rifle drilled passages. In addition, such passages may be provided with a spindle and/or sleeve to accommodate the potential future addition of tire inflation system functionality to a vehicle without having to install a new spindle or replace the axle assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system comprising:
    an axle housing;
    a spindle that supports a first wheel bearing and a second wheel bearing, the first wheel bearing being axially positioned between the axle housing and the second wheel bearing, the spindle including:
        a first end surface that engages the axle housing;
        a second end surface disposed opposite the first end surface;
        an internal surface that extends from the first end surface to the second end surface and that at least partially defines a hole for receiving an axle shaft;
        an external surface disposed opposite the internal surface;
        a passage for routing pressurized gas through the spindle, the passage including:
            a first portion that extends from the external surface toward the internal surface;
            a second portion that extends from the external surface toward the internal surface; and
            a third portion that connects the first portion to the second portion and is spaced apart from the second end surface, wherein the first portion, second portion, and third portion are axially positioned between the first end surface and the first wheel hearing.

2. The system of claim 1 wherein the first portion and the second portion are spaced apart from each other.

3. The system of claim 2 wherein the spindle extends along an axis and wherein the first portion and the second portion extend toward the axis.

4. The system of claim 3 wherein the first portion has a greater length than the second portion.

5. The system of claim 1 wherein the third portion extends from the first end surface to the second portion.

6. The system of claim 5 wherein a plug is disposed in the third portion between the first end surface and the first portion.

7. The system of claim 1 wherein the third portion extends linearly from the first end surface toward the first wheel bearing.

8. The system of claim 1 wherein the third portion extends from the first wheel bearing to the first portion.

9. The system of claim 8 wherein a plug is disposed in the third portion between the first wheel bearing and the second portion.

10. The system of claim 1 wherein the third portion receives pressurized gas from the first portion and the second portion receives pressurized gas from the third portion.

11. A tire inflation system comprising:
an axle housing;
a spindle that is disposed along an axis and is configured to support a first wheel bearing, the spindle including:
a first end surface that engages the axle housing;
an internal surface that at least partially defines a hole for receiving an axle shaft;
an external surface disposed opposite the internal surface;
a passage for routing pressurized gas through the spindle, the passage including:
a first portion that extends from the external surface toward the internal surface;
a second portion that extends from the external surface toward the internal surface; and
a third portion that connects the first portion to the second portion, wherein the third portion extends from the first end surface to the second portion; and
a plug that is disposed in the third portion.

12. The tire inflation system of claim 11 wherein the spindle has a second end surface that is disposed opposite the first end surface, wherein the third portion is spaced apart from the second end surface.

13. The tire inflation system of claim 11 further comprising a second wheel bearing that is disposed on the spindle, wherein the first wheel bearing is axially positioned between the axle housing and the second wheel bearing and the plug is axially positioned between the first wheel bearing and the first end surface.

14. The tire inflation system of claim 13 wherein the first portion, second portion, and third portion are axially positioned between the first end surface and the first wheel bearing.

15. The tire inflation system of claim 13 wherein the plug is axially positioned between the first end surface and the first portion.

16. A tire inflation system comprising:
an axle housing;
a spindle that is disposed along an axis and is configured to support a first wheel bearing and a second wheel bearing, the first wheel bearing being axially positioned between the axle housing and the second wheel bearing, the spindle including:
a first end surface that engages the axle housing;
a second end surface that is disposed opposite the first end surface;
an internal surface that at least partially defines a hole for receiving an axle shaft;
an external surface disposed opposite the internal surface;
a passage for routing pressurized gas through the spindle, the passage including:
a first portion that extends from the external surface toward the internal surface;
a second portion that extends from the external surface toward the internal surface; and
a third portion that connects the first portion to the second portion, wherein the third portion is disposed between and is spaced apart from the first end surface and the second end surface, wherein the first portion, second portion, and third portion are axially positioned between the first end surface and the first wheel bearing; and
a plug that is disposed in the third portion.

17. The tire inflation system of claim 16 wherein the third portion is spaced apart from the internal surface.

18. The tire inflation system of claim 16 wherein the plug is axially positioned between the first wheel bearing and the first end surface.

19. The tire inflation system of claim 18 wherein the plug is axially positioned between the first wheel bearing and the second portion.

20. The tire inflation system of claim 16 wherein the passage is configured to provide pressurized gas to a wheel end seal assembly that is axially positioned between the first wheel bearing and the axle housing.

* * * * *

UNITED STATES PATENT AND TRADEMARK OFFICE
CERTIFICATE OF CORRECTION

PATENT NO. : 10,035,384 B2
APPLICATION NO. : 15/254743
DATED : July 31, 2018
INVENTOR(S) : Christopher Keeney et al.

Page 1 of 1

It is certified that error appears in the above-identified patent and that said Letters Patent is hereby corrected as shown below:

In the Claims

Column 6, Lines 64-65, Claim 1:
After "and the first wheel"
Delete "hearing" and
Insert -- bearing --.

Signed and Sealed this
Twenty-fifth Day of December, 2018

Andrei Iancu
*Director of the United States Patent and Trademark Office*